United States Patent
Mayhew et al.

(10) Patent No.: US 10,204,139 B2
(45) Date of Patent: Feb. 12, 2019

(54) SYSTEMS AND METHODS FOR PROCESSING GEOGRAPHIC DATA

(71) Applicant: Verizon Patent and Licensing Inc., Basking Ridge, NJ (US)

(72) Inventors: Kevin Mayhew, Red Lion, PA (US); Brian B. Quinion, Sheffield (GB); Antony M. Pegg, East Petersburg, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 88 days.

(21) Appl. No.: 14/270,317

(22) Filed: May 5, 2014

(65) Prior Publication Data
US 2014/0330858 A1 Nov. 6, 2014

Related U.S. Application Data

(60) Provisional application No. 61/820,156, filed on May 6, 2013.

(51) Int. Cl.
*G06F 17/30* (2006.01)

(52) U.S. Cl.
CPC .. *G06F 17/30477* (2013.01); *G06F 17/30241* (2013.01); *G06F 17/30545* (2013.01)

(58) Field of Classification Search
CPC ............. G06F 17/30241; G06F 17/30545
See application file for complete search history.

(56) References Cited

U.S. PATENT DOCUMENTS

| | | | |
|---|---|---|---|
| 5,655,116 A * | 8/1997 | Kirk | G06F 17/30433 |
| 2007/0015119 A1* | 1/2007 | Atenasio | G01C 21/20 434/130 |
| 2007/0276845 A1* | 11/2007 | Geilich | G06F 17/30241 |
| 2008/0154888 A1* | 6/2008 | Buron | G06F 17/3087 |
| 2009/0234817 A1* | 9/2009 | Kortge | G01C 21/32 |
| 2011/0029398 A1* | 2/2011 | Boudville | G06F 17/3087 705/26.1 |
| 2012/0278339 A1* | 11/2012 | Wang | G06F 17/30241 707/748 |

* cited by examiner

*Primary Examiner* — Robert W Beausoliel, Jr.
*Assistant Examiner* — Nirav K Khakhar

(57) ABSTRACT

Systems, methods, and computer-readable media are provided for processing geographic data and identifying geographic locations. In one implementation, a computer-implemented method is provided that is performed by one or more processors, the method comprising operations including receiving a query including an address, parsing the address into tokens, and sending the tokens to one or more harvesters. The method also includes receiving one or more geographic location candidates from the one or more harvesters in response to the tokens, comparing the one or more candidates, and returning one or more geographic locations based on the comparison.

20 Claims, 3 Drawing Sheets

SYSTEMS AND METHODS FOR PROCESSING GEOGRAPHIC DATA

CROSS-REFERENCE TO RELATED APPLICATION(S)

This application claims the benefit of U.S. Provisional Application No. 61/820,156, filed May 6, 2013, which is expressly incorporated herein by reference in its entirety.

TECHNICAL FIELD

The present disclosure generally relates to computer-implemented systems and methods for processing geographic data, such as street addresses and postal or ZIP codes. More particularly, and without limitation, the present disclosure relates to system and methods for processing geographic data to identify a geographic location or set of geographic coordinates (e.g., a set of latitude and longitude coordinates).

BACKGROUND

Various solutions and techniques exist for determining a geographic location or set of coordinates based on geographic data, such as an address, postal or ZIP code, and/or other information. This process is often referred to geocoding and can be used by mapping applications or services, as well as media, social networking, and geotagging applications.

Geocoders are computer-implemented applications or web-based services that assist with geocoding. Conventional geocoders, however, have several drawbacks. For example, geocoders are often designed to work with a single data set, having a particular format. This can present several problems. For example, such geocoders do not provide much flexibility since they are limited to the scope of the single data set. Further, such geocoders require significant efforts to change data sets. Moreover, because they are limited to a particular data set or format, they lack the ability to compare information from different data sets to provide the best output or information.

In view of the foregoing, there is a need for improved systems and methods for processing geographic data. Moreover, there is a need for improved systems and methods for geocoding that can address one or more of the above-identified disadvantages and drawbacks of conventional geocoders and techniques.

SUMMARY

Consistent with the present disclosure, improved systems and methods are provided for processing geographic data and identifying geographic locations. In addition, systems and methods are provided for geocoding and determining one or more geographic locations for a query containing geographic data, such as an address. The present disclosure includes various embodiments and features, including those that address the above-identified disadvantages and drawbacks of conventional geocoders and techniques.

In accordance with some embodiments, a computer-implemented method is provided for processing a query and determining one or more geographic locations. The method may be implemented with one or more processors and comprise receiving a query including geographic data, such as an address. Further, the method may comprise parsing the address into tokens and sending the tokens to one or more harvesters. The method may comprise receiving one or more geographic location candidates from the one or more harvesters in response to the tokens. The method may comprise comparing the one or more candidates. The method may comprise returning one or more geographic locations based on the comparison.

In accordance with some embodiments, a system is provided for processing a query and determining one or more geographic locations. The system may comprise a storage medium storing a set of instructions. The system may also comprise at least one processor that executes the set of instructions to perform a method. The method may comprise receiving a query including geographic data, such as an address. Further, the method may comprise parsing the address into tokens and sending the tokens to one or more harvesters. The method may comprise receiving one or more geographic location candidates from the one or more harvesters in response to the tokens. The method may comprise comparing the one or more candidates. The method may comprise returning one or more geographic locations based on the comparison.

In accordance with some embodiments, a non-transitory computer-readable medium is provided that stores a set of instructions which, when executed by at least one processor, causes the at least one processor to perform a method for determining one or more geographic locations. The method may comprise receiving a query including geographic data, such as an address. Further, the method may comprise parsing the address into tokens and sending the tokens to one or more harvesters. The method may comprise receiving one or more geographic location candidates from the one or more harvesters in response to the tokens. The method may comprise comparing the one or more candidates. The method may comprise returning one or more geographic locations based on the comparison.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. It is important, therefore, to recognize that the sample claims should be regarded as including such equivalent constructions insofar as they do not depart from the spirit and scope of the present disclosure.

BRIEF DESCRIPTION OF THE DRAWINGS

The accompanying drawings, which are incorporated in and constitute a part of this specification, illustrate several embodiments of the present disclosure and together with the description, serve to explain the principles of the disclosed embodiments.

DETAILED DESCRIPTION OF EXEMPLARY EMBODIMENTS

Embodiments of the present disclosure provide improved systems and methods for processing geographic data and identifying geographic locations. In addition, embodiments of the present disclosure provide improved systems and methods for geocoding and determining one or more geographic locations for a query containing geographic data, such as an address.

In certain embodiments, systems and methods are provided for geocoding. In some embodiments, the geocoding results may be improved by comparing candidate locations for an address retrieved from different data sources. This may be achieved, for example, by using one or more harvesters to retrieve candidates from the different data sources. The candidates may then be scored to present the results to a user.

In some embodiments, multiple rounds of candidate gathering may be performed. For example, embodiments consistent with the present disclosure may first search for exact matches for an address. This could include looking for the exact address in a point dataset. Point datasets may store a geographic location (e.g., latitude and longitude) for a given address. If an exact match is not found in the point dataset, then embodiments consistent with the present disclosure may search for exact matched in an interpolated dataset. Interpolated datasets may interpolate a location for an address based on geographic information. The geographic information may include a length of the road and the range of house numbers along the length or the road (e.g., 1-99 Main Street). So if you looked for 50 Main Street, interpolation may be used to work out the approximate location of where #50 is between #1 and #99. If an exact match cannot be found, embodiments consistent with the present disclosure may then search for non-exact matches (e.g., the search was for 50 W Main St, but the entry is for 50 Main Street) and/or partial matches (e.g., the search was for 50 Main, but the entry is for 50 Main Street).

Figure 1:
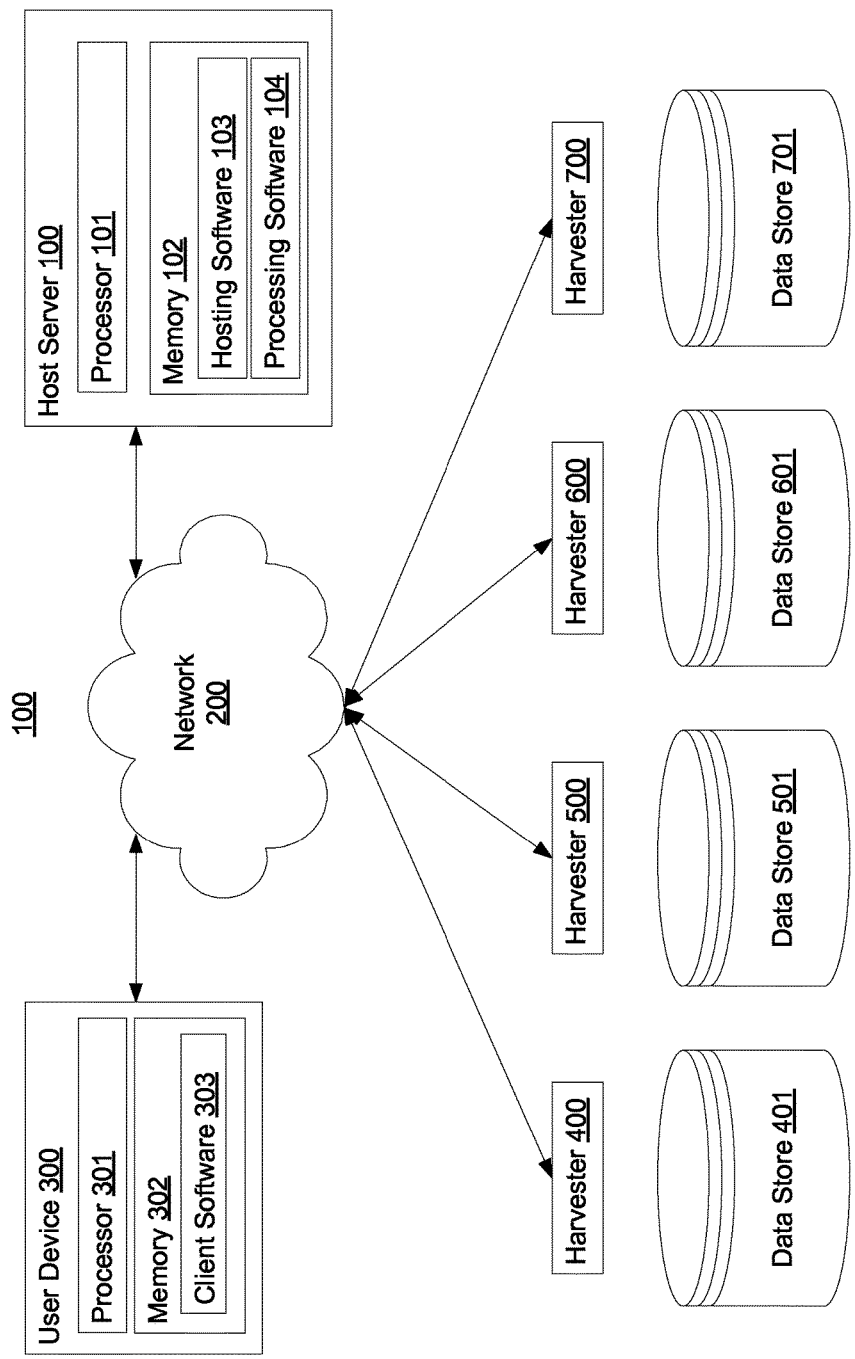
FIG. 1 depicts a block diagram of an exemplary system environment in which embodiments consistent with the present disclosure may be practiced and implemented.

FIG. 1 depicts a block diagram of an exemplary system environment in which embodiments consistent with the present disclosure may be practiced and implemented. The exemplary embodiment of FIG. 1 includes a system 100. System 100 may include one or more server systems, databases, and/or computing systems configured to receive information from entities in a network, process the information, and communicate the information with other entities in the network. For example, system 1 may be configured to receive data over an electronic network (e.g., the Internet), process/analyze queries and data, and provide geographic locations to users.

The various components of system 100 may include an assembly of hardware, software, and/or firmware, including a memory, a central processing unit ("CPU"), and/or a user interface. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, touch screen, and/or mouse.

As described above, system 100 may be configured to receive data over a network (such as electronic network 200), process/analyze queries and data, and provide geographic locations to users. Examples of electronic network 150 include a local area network (LAN), a wireless LAN (e.g., a "WiFi" network), a wireless Metropolitan Area Network (MAN) that connects multiple wireless LANs, a wide area network (WAN) (e.g., the Internet), and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, electronic network 150 may also include one or more mobile device networks, such as a GSM network or a PCS network, that allow mobile devices, such as a primary or secondary user device, to send and receive data via applicable communications protocols, including those described above. Further, as illustrated in FIG. 1, system 100 may operate and/or interact with one or more host servers 100, one or more user devices 300, one or more harvesters 400-700, and/or one or more data stores 401-701 for the purpose of providing geographic information to users and implementing other features described herein.

Data stores 401-701 may store location information in a variety of formats, such as a database, AP, Lucene, CAF, GNIS, text file, spreadsheet, etc. Data stores 401-701 also may include data from one or more third-party sources, such as TOMTOM® or NAVTEQ®, or user entered information, such as corrected location files, user enter streets or destinations, etc. Harvesters may run queries on these data sets and convert the search results from their native format into a format of the API.

User devices, such as user device 300, may include one or more processors 301 and memories 302. Processor(s) 301 may be any type of CPU and memory/(ies) 302 may be any type of memory, such as ay one of the examples discussed above. By way of example, user device 300 may be implemented with one or more of a tablet device, a mobile phone, GPS, navigation system, computer, laptop, personal digital assistant (PDA), television, or any other device that a user may use to submit queries and display or view content.

Memory 302 may store client software 303 for execution by one or more processors 301. Client software 303 may include a browser, a mapping application, a navigation application, or application or any other instructions for presenting geographic information to a user.

Host servers, such as host server 100, may include one or more processors 101 and memories 102. Processor(s) 101 and memory/(ies) 102 may comprise any of the types of CPU or memory discussed above. Memory 102 may store hosting software 103 and/or processing software 104 for execution by processor 101. Host server 100 may be implemented using one or more technologies, such as JAVA, Apache/Tomcat, HTML, etc.

Hosting software 103 may include, for example, one or more instructions for providing a website. The website, for example, may include one or more fields where a user may submit geographic data, such as an address. An address may include one or more of, for example, a street, street number, zip code, city, state, area code, county, country, etc. The website may also provide, for example, a map that displays a geographic location for the entered address. Additionally, or alternatively, the website may provide other content or information based on an identified geographic location, such as directions, points of interest (POIs), social networking content, photographs, media, chat, blogs, listings, search results, advertisements, etc.

In one embodiment, the hosting software may include one or more instructions for interfacing with a native application or plug-in on user device 300. The native application or plug-in may generate or include, for example, one or more fields where a user may enter geographic data, such as an address. The native application or plug-in may also generate or provide, for example, a map that displays a geographic location for the entered address. Other content is also possible, such as that described in the preceding paragraph.

Processing software 104 may include, for example, one or more instructions for providing one or more geocoders or geocoder functional ities. These instructions may include several modules, such as a scoring module and a query processor. The instructions may also provide an application program interface (API) for communication with harvesters 400-700.

The API may provide a consistent interface between the host server 100 and the harvesters 400-700. For example, the format of the query components received by the harvesters 400-700 and the candidates returned by harvesters 400-700 may be the same for each of the harvesters 400-700. This may allow the host server to interact with a number of data sources at once or to change data sources quickly.

Harvesters 400-700, may include one or more processors (not shown) and one or more memories (not shown). The processor(s) and memory/(ies) of each harvester may be implemented with any of the types of CPU or memory discussed above. The memory for a harvester may store software for execution by one or more processors. The software may, for example, receive a set of query components and return a set of one or more candidate locations for the components. The candidate locations may be determined using one or more data stores 401-701 for each harvester. In some embodiments, there is a one-to-one relationship between harvesters and its data store. In some embodiments, there may be multiple harvesters per data store. Harvesters 400-700 may be implemented to translate data between the formats of the API and the formats of the data sets stored in their respective data stores 401-701.

Figure 2:
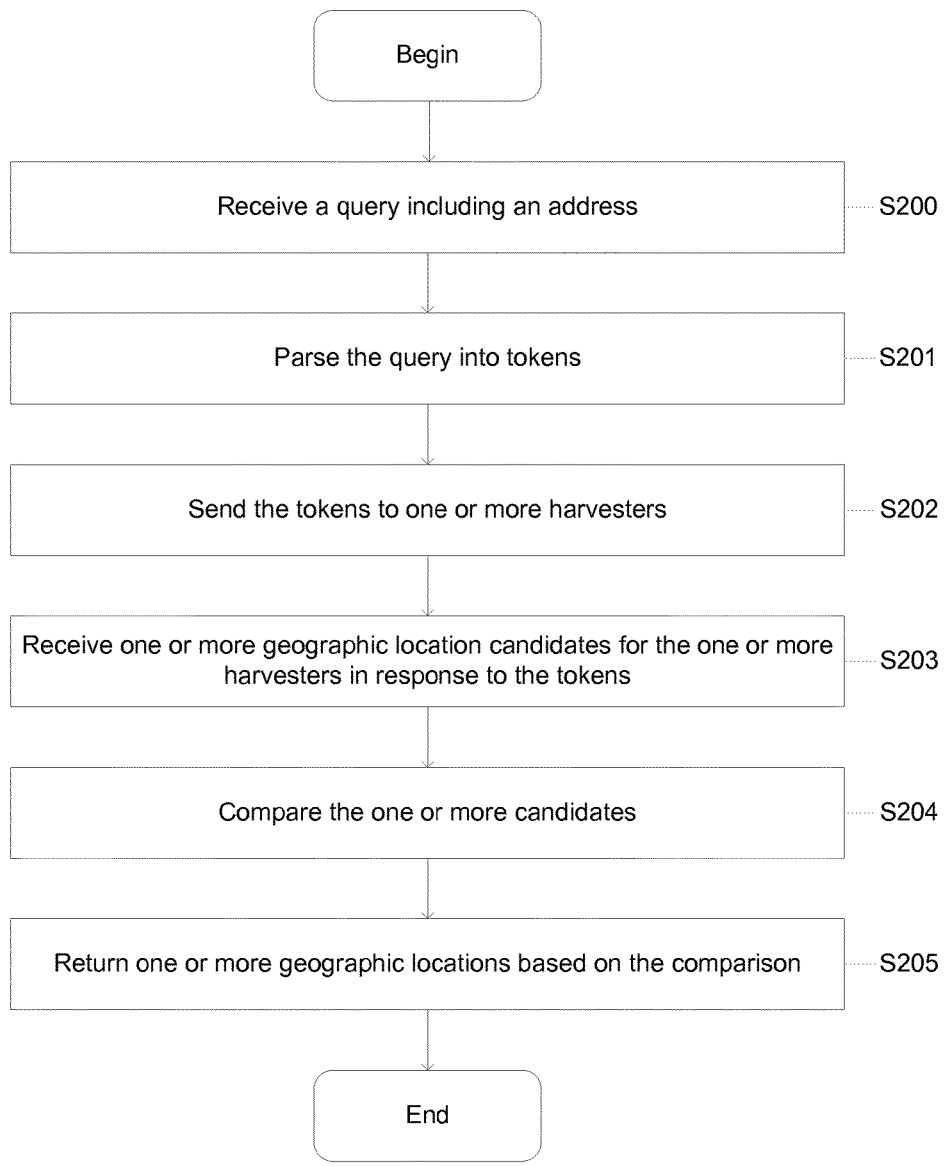
FIG. 2 depicts an exemplary process for determining one or more geographic locations based on a query.

FIG. 2 depicts a flowchart of an exemplary process 200 for determining one or more geographic locations based on a query, consistent with embodiments of the present disclosure. The exemplary method 200 of FIG. 2 may be performed by, for example, processing software 104 executed by one or more processors 101.

As illustrated in FIG. 2, in S200, processing software 104 may receive a query that includes an address. For example, the query may be "50 Main St."

In S201, processing software 104 may parse the query into tokens. This may be based, for example, on whitespace in the query. Using the example above, the tokens would be "50," "Main," and "St."

In S202, processing software 104 may send the tokens to one or harvesters 400-700. The tokens may be sent using a standardized API, as discussed above. This may allow the processing software 104 to use the same interface for each of the harvesters without regard to the structure of the data set operated on by the harvesters. As part of step S202, one or more load balancing techniques may also be employed. For example, a harvester for a particular source may be assigned a virtual IP address. Load balancing software may then be used to select between instances of the harvester to process the tokens.

In S203, processing software 104 may receive one or more geographic location candidates from the one or harvesters 400-700. The candidates may be sent using a standardized API, as discussed above. This may allow the processing software 104 to use the same interface for each of the harvesters without regard to the structure of the data set operated on by the harvesters. The standardized format may also allow the processing software to compare candidates from different harvesters. In some embodiments, steps S202 and S203 may be repeated to provide multiple rounds of candidate gathering, as discussed in more detail below.

In S204, processing software 104 may compare the one or more candidates received from the one or more harvesters 400-700. This may include, for example, scoring the candidates. In one embodiment, different tokens may be given different weights. Using the example above, the token "50" may have a weight T1, the token "Main" may have a weight T2, and the token "St" may have a weight T3. The score may indicate, for example, which results are the most accurate. For example, in one embodiment, scores may be given to each candidate based on the sum of token weights of the tokens that are relevant to that candidate. Higher scored candidates may be deemed more accurate. Additionally, a threshold score may be set before a candidate is deemed relevant or sufficient to return or use as output.

In S205, processing software 104 may return one or more geographic locations based on the comparison. This may include, for example, sending the location to hosting software 103. Using the example discussed above, hosting software 103 may provide a website that displays a map depicting the returned geographic location for "50 Main St." Additionally, or alternatively, the website may display other content or information based on an identified geographic location, such as directions, points of interest (POIs), social networking content, photographs, media, chat, blogs, listings, search results, advertisements, etc.

Figure 3:
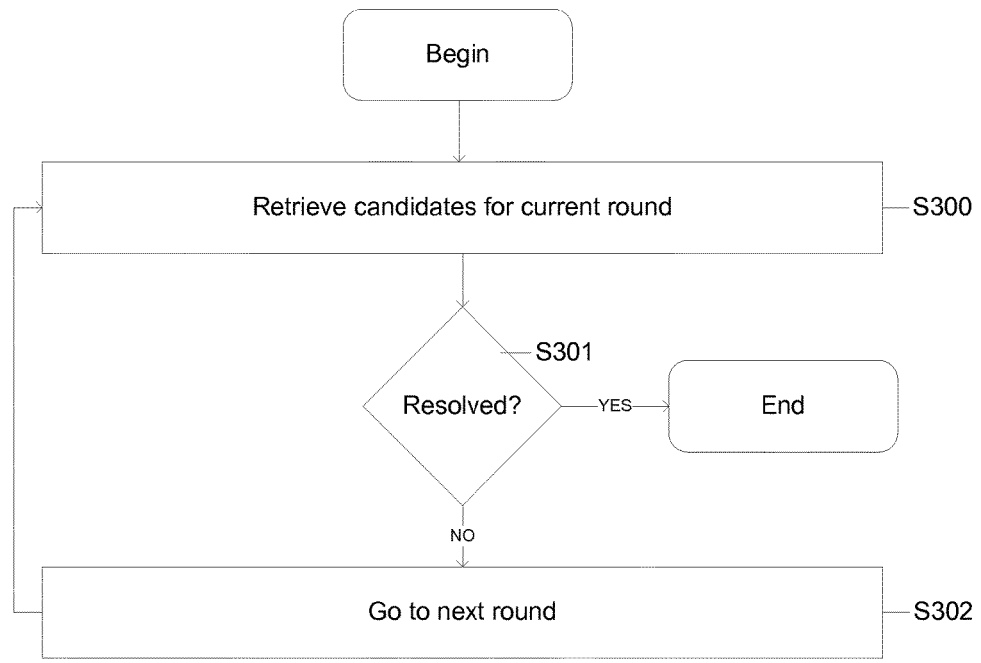
FIG. 3 depicts an exemplary process for determining one or more geographic location candidates for a query.

FIG. 3 depicts a flowchart of an exemplary process 300 for determining one or more geographic location candidates for a query, consistent with embodiments of the present disclosure. The exemplary method 300 depicted in FIG. 3 may performed by processing software 104 to perform multiple round candidate determination.

In S300, processing software 104 can retrieve candidates for a current round of processing. For example, using steps S202 and S203 discussed above with reference to FIG. 2.

In S301, processing software may determine whether the query has been resolved. A query may be resolved when one or more matching locations are found or when there is a certain likelihood that a correct match has been found (e.g., based on a score or the degree of matching). For example, by using S204 discussed above with reference to FIG. 2. If the query is resolved, the process may end, and the results may be returned in S205. If the query is not resolved, the processing software may go to the next round in S302 and repeat the process.

The process of FIG. 3 may allow the processing software 104 to gradually increase the scope of the query, which may allow the software to run easier and/or faster queries first. This may improve the overall performance of the system. For example, in the first round one, the processing software 104 may send queries to exact match harvesters on one or more point data sets. Point datasets may store a geographic location (e.g., latitude and longitude) for a given address. Using the example from above, a point data set may store the latitude and longitude for 50 Main St. If this were true, the result for round one would be to return the results. If a search of the point data sets did not return an exact match, the process would proceed to the next round.

In round two, for example, the processing software 104 may send queries to exact match harvesters on one or more interpolated data sets. As discussed above, interpolated data sets may interpolate a location for an address based on geographic information. The geographic information may include a length of the road and the range of house numbers along the length or the road (e.g., 1-99 Main Street). So using the example of "50 Main Street," interpolation may be used to work out the approximate location of where #50 is between #1 and #99. This additional processing for interpolation may make these queries slower than processing point data sets that do not require interpolation. Thus, it may be advantageous to conduct the point data set processing first, as described above. If the query is resolved using the interpolated data set, the result for round two would be to return the results. If a search of the interpolated data sets did not return an exact match, the process would proceed to the next round.

In round three, ambiguous query processing may be performed. Because this may require additional processing, it may be advantageous to perform these queries after the exact match queries. The ambiguous query processing may also be divided into multiple rounds. For example, the processing software 104 may have a round wherein the processing software looks for non-exact matches. This could be, for example, an instance where a user provides more information than is in the database. For example, the user may enter "50 W Main St.," but the entry is for "50 Main Street." In another example, the user may enter "50 Main Street Unit B," but the data source entry does not include "Unit B." The processing software 104 may have a round that includes looking resolving ambiguities from partial queries. For example, where the user typed "50 Main" instead of "50 Main St."

These rounds are merely exemplary and may be modified and still be consistent with the disclosure. For example, a user may order rounds based on the speed or attributes of the user's harvesters (e.g., by running the fastest or least expensive queries first).

It will be appreciated that any suitable configuration of software, processors, and data storage devices may be selected to carry out the embodiments of this disclosure, including system 100. The software and hardware associated with system 100 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various systems monitoring, reporting, and troubleshooting tools.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

It is intended, therefore, that the specification and examples be considered as exemplary only. Additional embodiments are within the purview of the present disclosure and the claims.

What is claimed:

1. A method comprising:
receiving, by one or more processors, a query including an address;
parsing, by the one or more processors, the address into tokens;
sending, by the one or more processors, the tokens to a plurality of harvester devices,
the plurality of harvester devices including:
a first harvester device configured to communicate with a first data store using a first protocol, and
a second harvester device configured to communicate with a second data store using a second protocol different from the first protocol;
determining, by the one or more processors and based on sending the tokens, that a search by the plurality of harvester devices did not return an exact match to the address;
interpolating, by the one or more processors, the address to determine one or more interpolated data sets based on determining that the search by the plurality of harvester devices did not return the exact match to the address;
sending by the one or more processors, queries to the plurality of harvester devices based on the one or more interpolated data sets;
receiving, by the one or more processors, at least one interpolated geographic location candidate based on sending the queries to the plurality of harvester devices;
comparing, by the one or more processors, geographic location candidates of a candidate set, the candidate set including the at least one interpolated geographic location candidate;
identifying, by the one or more processors, one or more geographic locations based on comparing the geographic location candidates of the candidate set; and
providing, by the one or more processors, information associated with the one or more geographic locations for display.

2. The method of claim 1, further comprising:
scoring the geographic location candidates.

3. The method of claim 1, further comprising:
applying a first weight to a first one of the tokens, and
applying a second weight to a second one of the tokens, the first weight being different than the second weight.

4. The method of claim 1, further comprising:
performing multiple rounds of candidate gathering to receive the geographic location candidates.

5. The method of claim 1, wherein the first harvester device comprises an exact match harvester device executing on multiple point data sets.

6. The method of claim 1, wherein the first harvester device comprises an exact match harvester device executing on the one or more interpolated data sets.

7. The method of claim 1, wherein the second harvester device comprises an ambiguous harvester device executing on the one or more interpolated data sets.

8. The method of claim 4, further comprising:
performing a round of the multiple rounds of candidate gathering by executing another query for non-exact matches to the address.

9. The method of claim 4, further comprising:
performing a round of the multiple rounds of candidate gathering by executing another query for partial matches to the address.

10. The method of claim 4, further comprising:
performing a round of the multiple rounds of candidate gathering based on an attribute of one of the plurality of harvester devices.

11. A system comprising:
a memory; and
at least one processor, coupled to the memory, to:
receive a query including an address;
parse the address into tokens;
send the tokens to a plurality of harvester devices, the plurality of harvester devices including:
a first harvester device configured to communicate with a first data store using a first protocol, and
a second harvester device configured to communicate with a second data store using a second protocol different from the first protocol;
determine, based on sending the tokens, that a search by the plurality of harvester devices did not return an exact match to the address;
interpolate the address to determine one or more interpolated data sets based on determining that the search by the plurality of harvester devices did not return the exact match to the address;
send queries to the plurality of harvester devices based on the one or more interpolated data sets;
receive at least one interpolated geographic location candidate based on sending the queries to the plurality of harvester devices; compare geographic location candidates of a candidate set,
the candidate set including the at least one interpolated geographic location candidate;
identify one or more geographic locations based on comparing the geographic location candidates of the candidate set; and
provide information associated with the one or more geographic locations for display.

12. The system of claim 11, wherein the at least one processor is further to:
score the geographic location candidates.

13. The system of claim 11, wherein the at least one processor is further to:
apply a first weight to a first one of the tokens, and
apply a second weight to a second one of the tokens, the first weight being different than the second weight.

14. The system of claim 11, wherein the at least one processor is further to:
perform multiple rounds of candidate gathering to receive the geographic location candidates.

15. The system of claim 11, wherein the first harvester device comprises an exact match harvester device executing on multiple point data sets.

16. The system of claim 11, wherein the first harvester device comprises an exact match harvester device executing on one or more interpolated data sets.

17. The system of claim 11, wherein the second harvester device comprises an ambiguous harvester device executing on one or more interpolated data sets.

18. The system of claim 14, wherein the at least one processor is further to:
perform a round of the multiple rounds of candidate gathering by executing another query for non-exact matches to the address.

19. The system of claim 14, wherein the at least one processor is further to:
perform a round of the multiple rounds of candidate gathering by executing another query for partial matches to the address.

20. A non-transitory computer-readable medium storing instructions, the instructions comprising:
one or more instructions that, when executed by at least one processor, causes the at least one processor to:
receive a query including an address;
parse the address into tokens;
send the tokens to a plurality of harvester devices, the plurality of harvester devices including:
a first harvester device configured to communicate with a first data store using a first protocol, and
a second harvester device configured to communicate with a second data store using a second protocol;
determine, based on sending the tokens, that a search by the plurality of harvesters did not return an exact match to the address;
interpolate the address to determine one or more interpolated data sets based on determining that the search by the plurality of harvester devices did not return the exact match to the address;
send queries to the plurality of harvester devices based on the one or more interpolated data sets;
receive at least one interpolated geographic location candidate based on sending the queries to the plurality of harvester devices;
compare geographic location candidates of a candidate set,
the candidate set including the at least one interpolated geographic location candidate;
identify one or more geographic locations based on comparing the geographic location candidates of the candidate set; and
provide information associated with the one or more geographic locations for display.

* * * * *